(12) United States Patent
Markevics (10) Patent No.: US 9,847,950 B1
(45) Date of Patent: Dec. 19, 2017

(54) MESSAGING SYSTEM THREAD POOL

(71) Applicant: Flexera Software LLC, Itasca, IL (US)

(72) Inventor: Martin Valdis Markevics, Mount Prospect, IL (US)

(73) Assignee: Flexera Software LLC, Itasca, IL (US)

( * ) Notice: Subject to any disclaimer, the term of this patent is extended or adjusted under 35 U.S.C. 154(b) by 0 days.

(21) Appl. No.: 15/460,448

(22) Filed: Mar. 16, 2017

(51) Int. Cl.
*G06F 15/16* (2006.01)
*H04L 12/863* (2013.01)
*H04L 12/927* (2013.01)

(52) U.S. Cl.
CPC ........ H04L 47/6225 (2013.01); H04L 47/803 (2013.01)

(58) Field of Classification Search
CPC .......... G06F 9/546; G06F 13/22; G06F 15/16; G06F 2209/5021; G06F 2209/548; G06Q 10/06; H04L 46/2441; H04L 46/52; H04L 46/6225; H04L 43/10
USPC ........ 709/203, 206, 219, 224; 719/314, 318; 710/46; 718/102, 103
See application file for complete search history.

(56) References Cited

U.S. PATENT DOCUMENTS

| | | | | |
|---|---|---|---|---|
| 8,209,702 B1* | 6/2012 | Roytman | ............... | G06F 9/5027 718/106 |
| 8,959,530 B1* | 2/2015 | Leonard | ................. | G06F 9/546 718/102 |
| 9,286,148 B1* | 3/2016 | Arimilli | .................. | G06F 9/546 |
| 9,563,423 B1* | 2/2017 | Pittman | ...................... | G06F 9/48 |
| 9,678,812 B2* | 6/2017 | Arimilli | .................. | G06F 9/546 |
| 2004/0010551 A1* | 1/2004 | Dorland | ............... | G06F 9/4881 709/206 |
| 2004/0199926 A1* | 10/2004 | Gilgen | .................. | G06F 9/5027 719/318 |
| 2005/0060374 A1* | 3/2005 | Phillips | ................... | G06F 9/546 709/206 |
| 2007/0067770 A1* | 3/2007 | Thomasson | ............... | G06F 9/52 718/100 |
| 2011/0191445 A1* | 8/2011 | Dazzi | ...................... | G06F 15/16 709/219 |
| 2012/0151063 A1* | 6/2012 | Yang | ..................... | G06F 9/5011 709/226 |
| 2012/0151272 A1* | 6/2012 | Behrendt | ................ | G06F 9/542 714/39 |
| 2013/0024875 A1* | 1/2013 | Wang | ..................... | G06F 13/22 719/318 |
| 2014/0047140 A1* | 2/2014 | Otenko | ................. | G06F 9/5027 710/54 |
| 2014/0068165 A1* | 3/2014 | DeCorte | ................. | G06F 9/544 711/104 |
| 2014/0337864 A1* | 11/2014 | Zhang | ..................... | G06F 9/542 719/318 |
| 2015/0082016 A1* | 3/2015 | Bonczkowski | ........... | G06F 8/61 713/100 |
| 2015/0082319 A1* | 3/2015 | Liu | ........................ | G06F 9/3851 718/107 |

* cited by examiner

Primary Examiner — Alina N Boutah
(74) Attorney, Agent, or Firm — Michael A. Glenn; Perkins Coie LLP (57) ABSTRACT

A thread pool of consumers polls existing queues. A thread manager controls the number of active threads. This approach limits the number of threads, but is still able to keep up with the volume of traffic.

8 Claims, 9 Drawing Sheets

MESSAGING SYSTEM THREAD POOL

FIELD

The invention relates to a messaging system. More particularly, the invention relates to a messaging system thread pool.

BACKGROUND

The Advanced Message Queuing Protocol (AMQP) is an open standard application layer protocol for message-oriented middleware. The defining features of AMQP are message orientation, queuing, routing (including point-to-point and publish-and-subscribe), reliability, and security.

AMQP mandates the behavior of the messaging provider and client to the extent that implementations from different vendors are interoperable, in the same way as SMTP, HTTP, FTP, etc. have created interoperable systems. Unlike JMS, which defines an API and a set of behaviors that a messaging implementation must provide, AMQP is a wire-level protocol. A wire-level protocol is a description of the format of the data that is sent across the network as a stream of bytes. Consequently, any tool that can create and interpret messages that conform to this data format can interoperate with any other compliant tool irrespective of implementation language.

AMQP is a binary, application layer protocol, designed to support a wide variety of messaging applications and communication patterns efficiently. It provides flow controlled, message-oriented communication with message-delivery guarantees such as at-most-once (where each message is delivered once or never), at-least-once (where each message is certain to be delivered, but may do so multiple times), and exactly-once (where the message will always certainly arrive and do so only once), and authentication and/or encryption based on SASL and/or TLS. It assumes an underlying reliable transport layer protocol such as Transmission Control Protocol (TCP).

Figure 1:
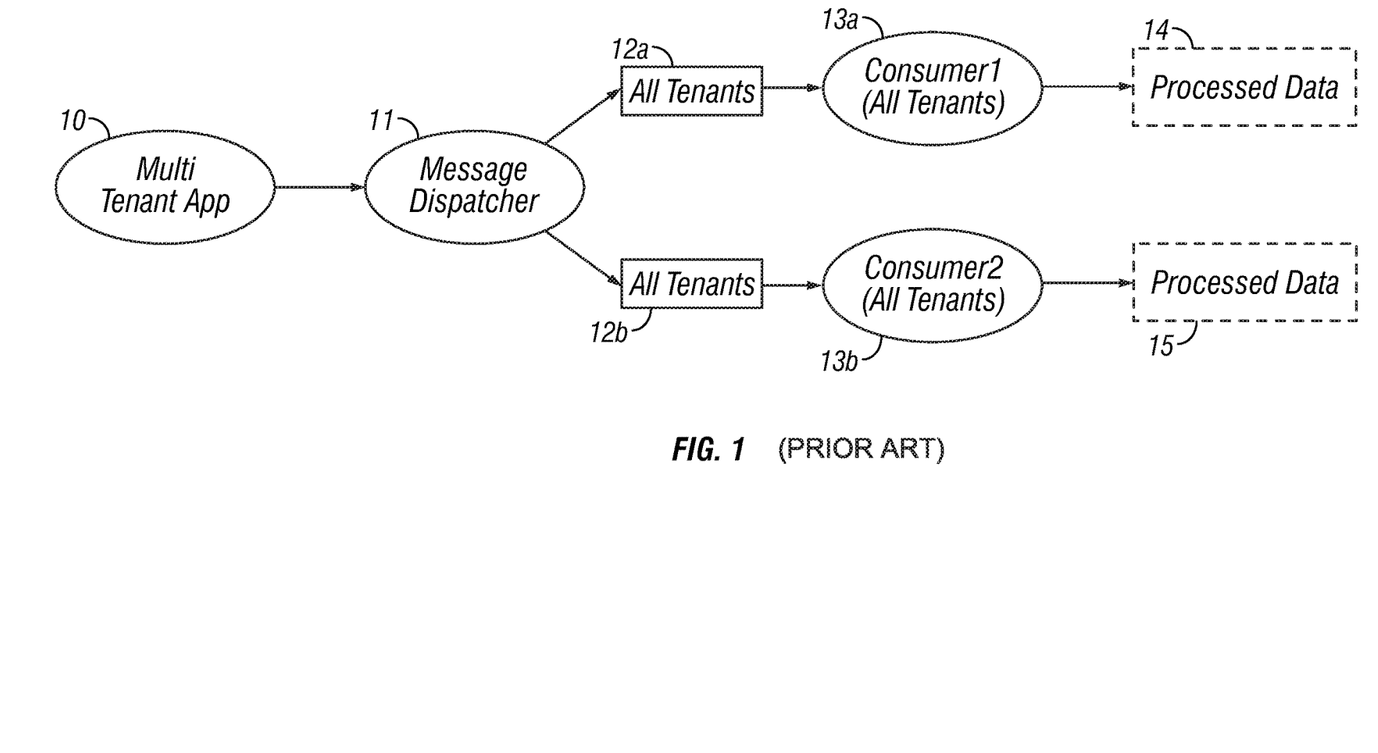
FIG. 1 is a block schematic diagram showing a messaging environment.

RabbitMQ is open source message broker software (sometimes called message-oriented middleware) that implements AMQP. RabbitMQ is used for messaging, for example, in Flexera Flexnet® Advanced Lifecycle Management (ALM). It is used to queue and process/replicate data to Flexnet Operations (LLM) and other components in the system, such as Usage Analytics Service (UAS) and License Fulfillment Service (LFS). In use, RabbitMQ includes a publisher and consumer. In one implementation of ALM, data from all tenants flows through two queues. FIG. 1 is a block schematic diagram showing a messaging environment, such as a RabbitMQ environment. In FIG. 1, a notification is sent from a multi-tenant app 10 via a message dispatcher 11. In this implementation, each queue 12a, 12b has its own consumer 13a, 13b, which routes the messages as processed data 14, 15.

Figure 2:
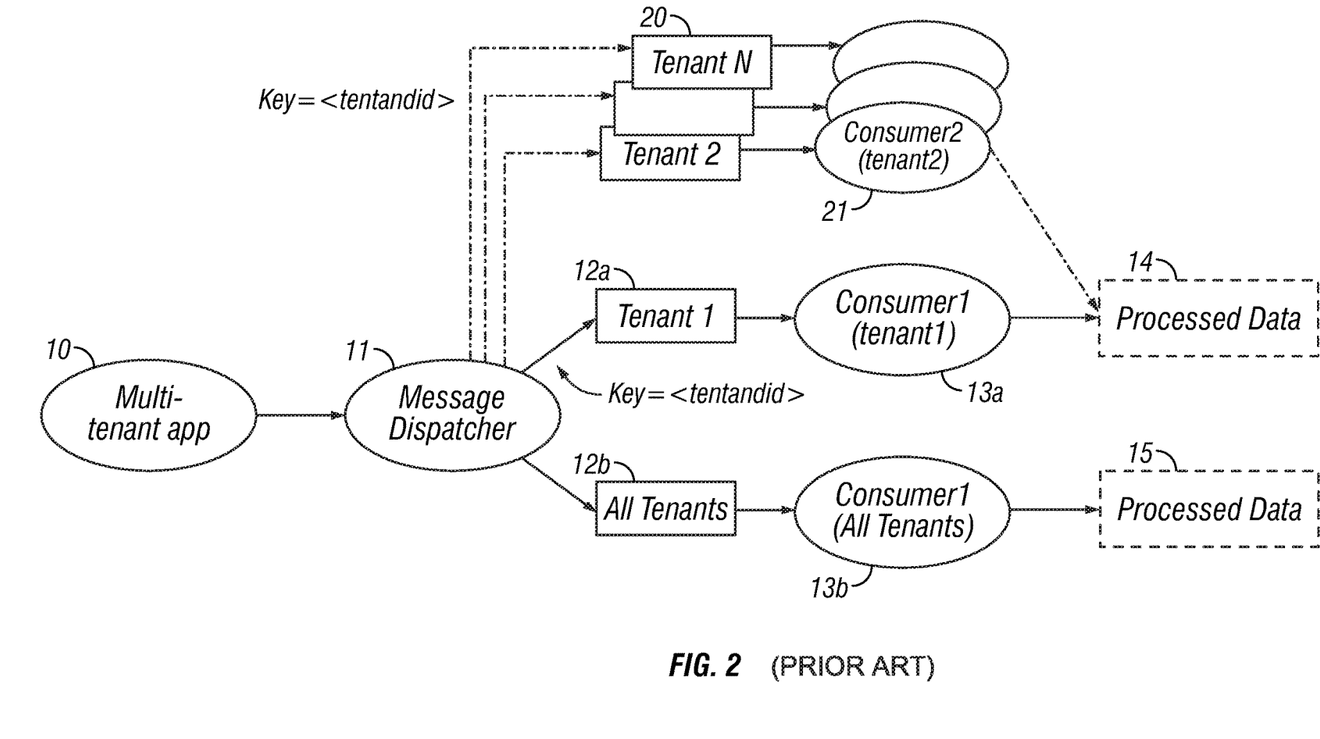
FIG. 2 is a block schematic diagram showing a messaging environment where each tenant's data flows through a different queue and has its own consumer.

This approach is problematic because there is so much data at times that the single consumer cannot keep up during peak periods. Furthermore, all data is processed serially, so other tenants are negatively impacted if one tenant generated lots of data/messages that had to be processed first. Thus, one tenant with heavy traffic could flood the queue and cause delays in processing messages from other tenants This bottleneck is particularly a problem for data replicated to Cloud components because sending each message over the Internet takes a significant amount of time. Thus, in another implementation each tenant's data flows through a different queue and has its own consumer (1 tenant=1 consumer=1 thread), as shown in FIG. 2, which is a block schematic diagram showing a messaging environment where each tenant's data flows through a different queue 20 and has its own consumer 21. This implementation provides one queue per tenant.

If the same architecture shown in FIG. 2 is applied to another part of the system, the system could spin up so many consumer threads that it could adversely affect the system, e.g. where # of threads=# of tenants*2, and that number would continue to grow as more tenants were added.

Figure 3:
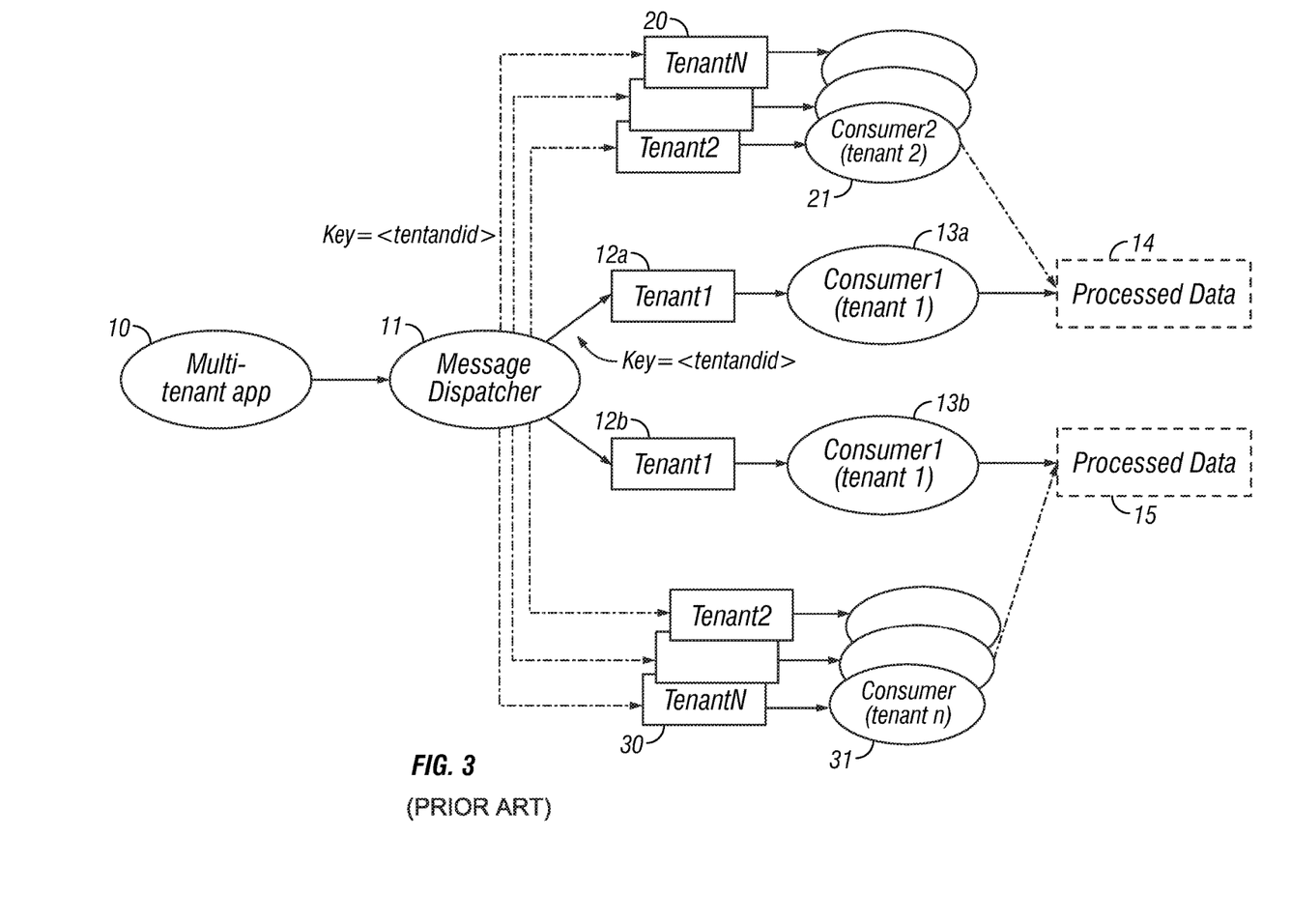
FIG. 3 is a block schematic diagram showing a messaging environment where each tenant's data flows through a different queue for replication.

FIG. 3 is a block schematic diagram showing a messaging environment where each tenant's data flows through a different queue 20, 30 for replication. The provision of one consumer 21, 31 per thread results in an inordinate number of threads.

SUMMARY

A presently preferred embodiment of the invention provides a thread pool of consumers that poll the queues. A thread manager controls the number of active threads. This approach limits the number of threads, but is still able to keep up with the volume of traffic.

DESCRIPTION

A presently preferred embodiment of the invention provides a thread pool of consumers that poll the queues. This approach limits the number of threads, but is still able to keep up with the volume of traffic.

Figure 4:
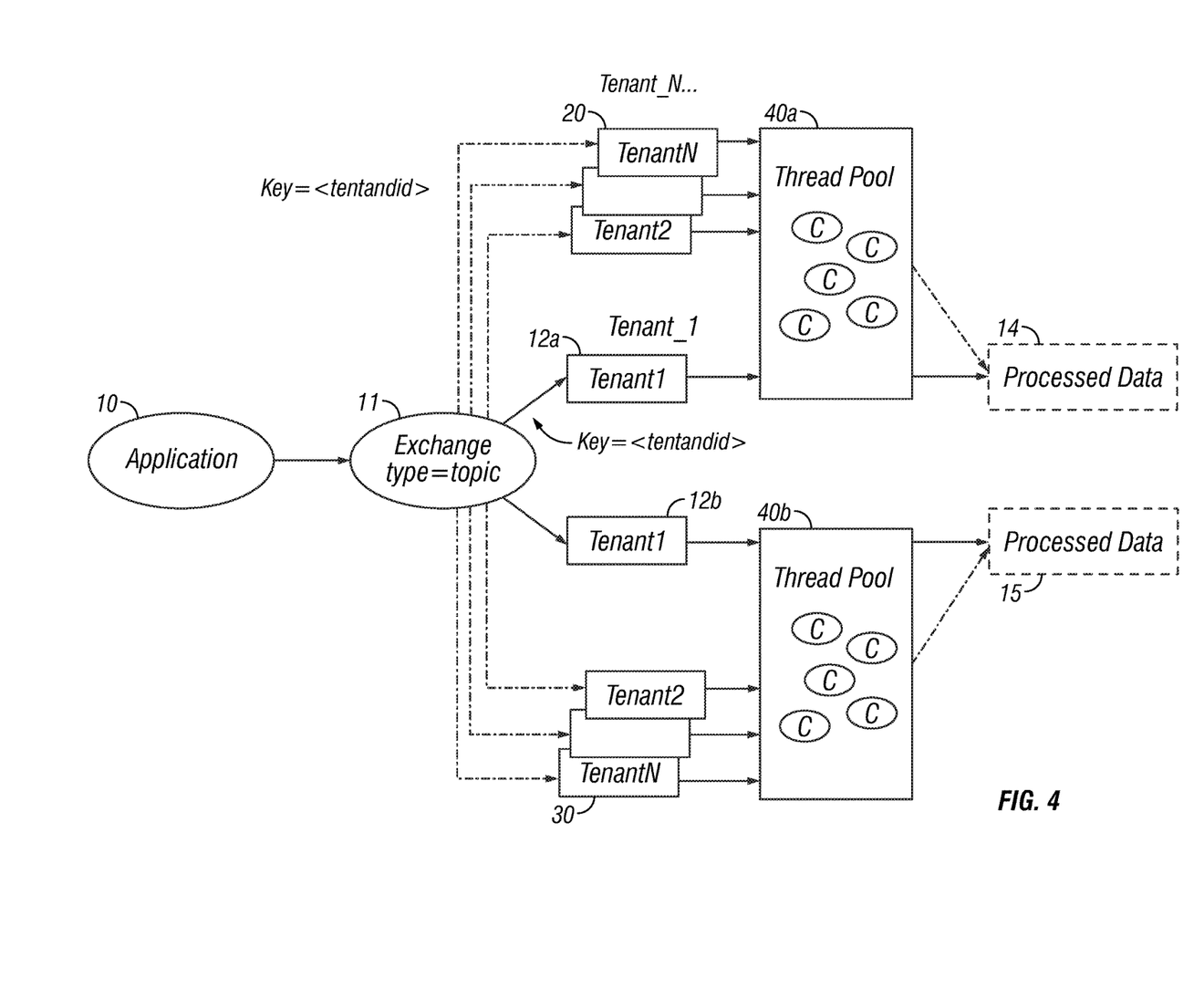
FIG. 4 shows a messaging environment having one queue per tenant with a thread pool of consumers that poll the queues according to the invention.

FIG. 4 shows a messaging environment, such as a RabbitMQ environment, having one queue per tenant with a thread pool of consumers 40a, 40b that poll the queues according to the invention. A traditional model using RabbitMQ spins up a single thread per queue per consumer. Because this is not practical, as discussed above, embodiments of the invention skip the thread if another thread is already processing. A thread manager (discussed below) controls the number of active threads.

Those skilled in the art will appreciate that the invention may be practiced with many other messaging systems and is not, therefore, limited to its use with RabbitMQ. For example, the invention is applicable to enterprise servers comprising multiple producers and consumers having small transaction payloads, such as messages or notifications.

In embodiments of the invention, thread pooling involves a thread manager that periodically looks at all threads to determine status, e.g. Is the thread busy? The QueueManager keeps track of which queues have an actively polling worker thread. The thread manager periodically checks this count and compares it against the total number of threads in the pool. If the counts are equal, then all threads are busy and the system can then spin up another thread, if the maximum number of allowed threads has not been reached. If all currently existing threads are busy, then the thread manager adds a thread; if the currently existing threads are not all busy, then the thread manager takes no action.

In embodiments of the invention, the worker/consumer threads poll the queues in a round-robin fashion. For example, if a first message producer has 1000 messages, then that message producer is assigned a thread for its first message. If a second producer has one message, then the second producer is assigned the next thread for its message. Round-robin fashion assures that each producer has equal access to threads in strict order without regard to message volume a producer may have. In this way, no producer is able to create a bottleneck due to its volume of traffic. Because the size of the thread pool is maintained dynamically by the thread manager, in most circumstances the proper number of threads is maintained for the amount of traffic and the number of producers actively using the messaging system. Embodiments of the invention use a maximum of ten threads in each pool, but the number of threads for a given application of this system could be different.

Each tenant's thread is assigned to a queue from a thread pool. Each consumer thread polls the queues in a round-robin fashion. As noted above, with a round-robin approach each consumer thread is assigned to a queue in equal portions and in circular order, handling all threads without priority. If a queue has any messages, that consumer thread processes the data. There is always a minimum of two threads, one manager and one consumer thread. The thread manager periodically monitors the state of all running consumer threads and, if all consumer threads are busy, e.g., connected to a queue and processing data, then it spins up another thread to help with the current load. Conversely, if a worker thread makes it round-robin through the entire queue list twice without finding any data, then it shuts down, unless it is the last consumer thread, which never shuts down. Thus, the number of threads dynamically scales up and down proportional to the volume of traffic, while still processing each queue in FIFO order.

Figure 5:
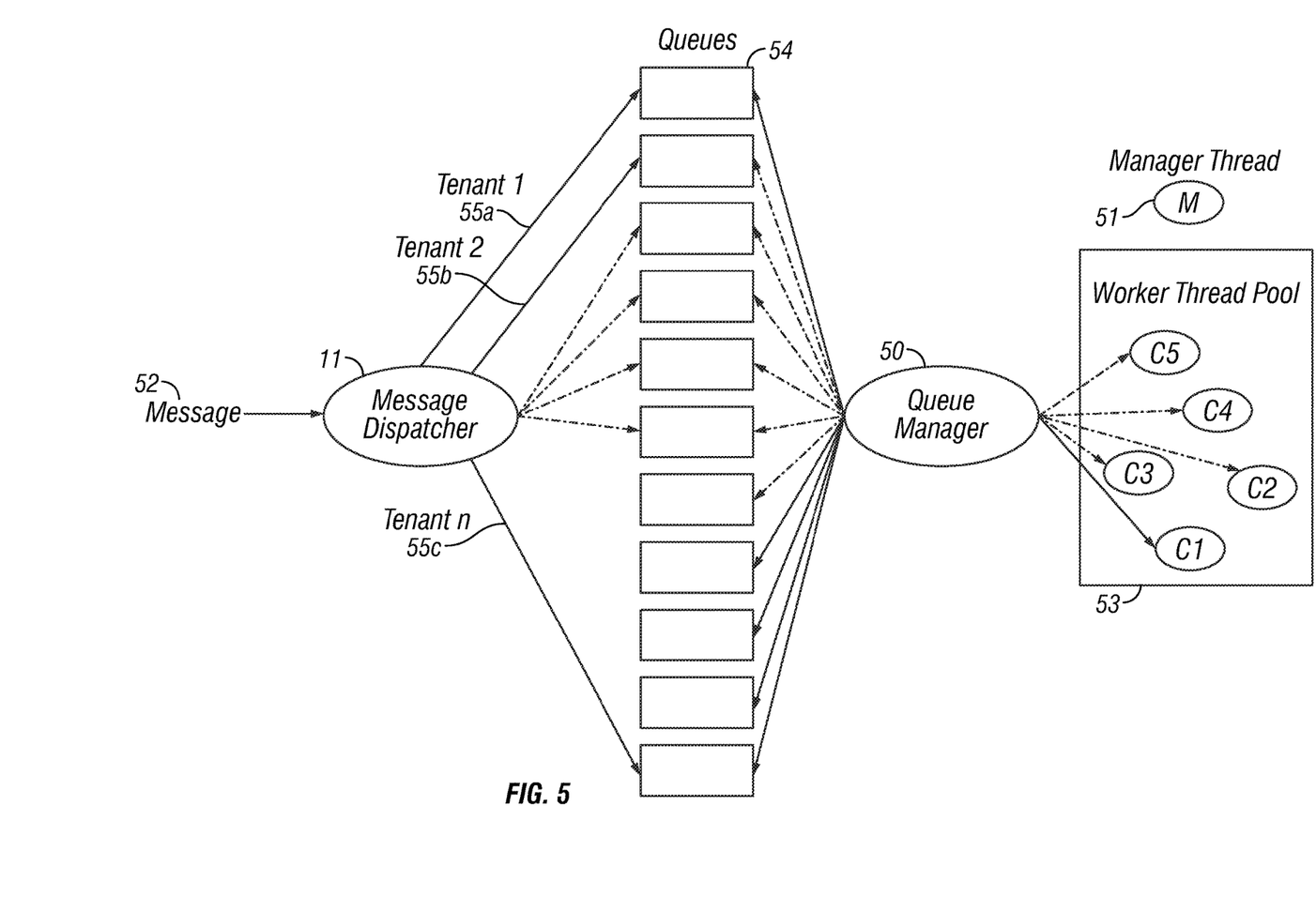
FIG. 5 is a block schematic diagram showing a messaging environment in which a queue manager controls the number of active threads according to the invention.

FIG. 5 is a block schematic diagram showing a messaging environment in which a message 52 is processed. In FIG. 5, a queue manager 50 controls the number of active threads for a plurality of queues 54 associated with a plurality of tenants 55a-55c. Each consumer thread polls the queues round-robin, i.e., it skips a thread if another thread is already processing. The thread manager 51 controls the number of active threads in the worker thread pool 53.

Figure 6:
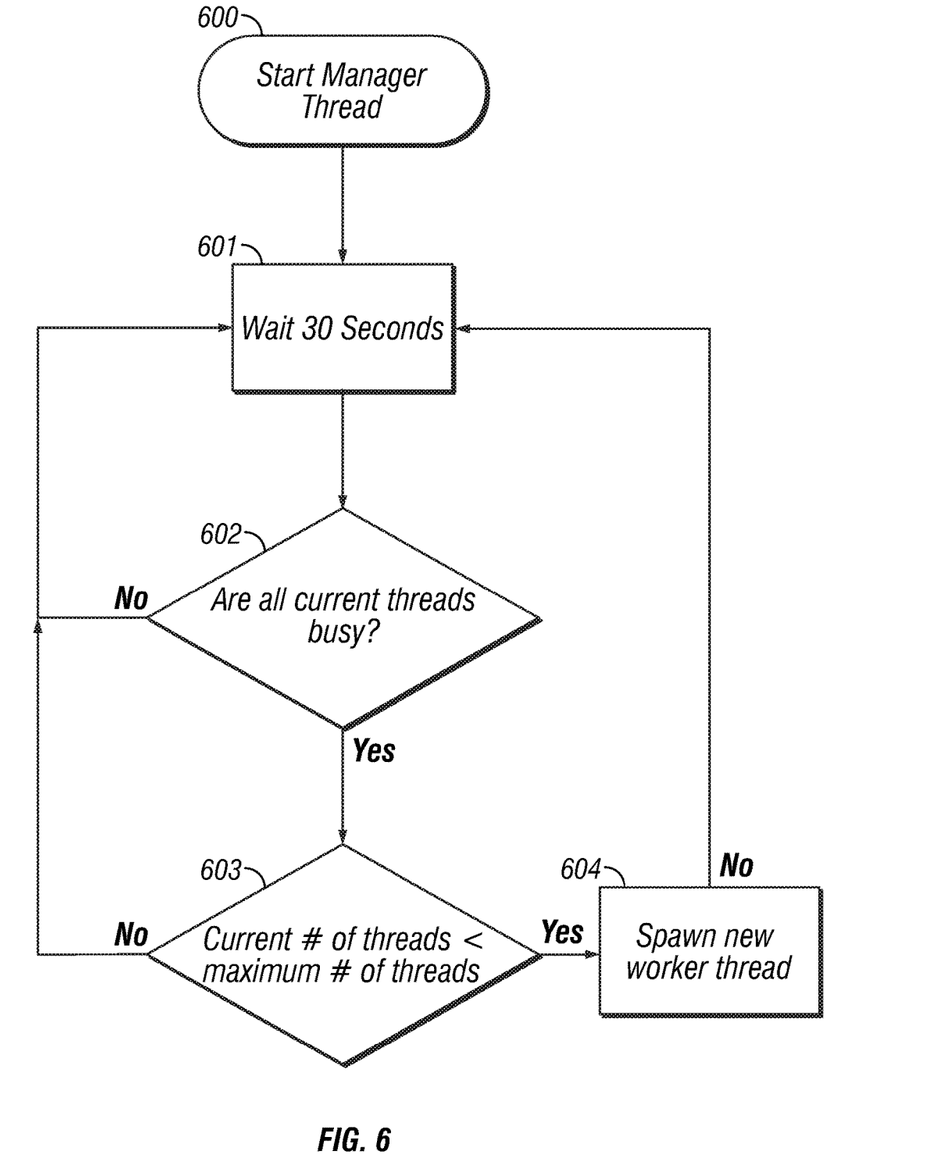
FIG. 6 is a flow diagram showing a thread manager algorithm in a messaging environment according to the invention.

FIG. 6 is a flow diagram showing a thread manager algorithm in a messaging environment according to the invention.

In FIG. 6, the thread manager starts. (600) In an embodiment of the invention, the thread manager waits thirty seconds (601). Those skilled in the art will appreciate that other wait periods may be used when practicing the invention. The thread manager tests to see if all current threads are busy (602). In embodiments of the invention, when the threads are not all busy, the thread manager waits another thirty seconds; when the threads are all busy, the thread manager determines if the current number of threads is less than the maximum number of threads that can be supported by the system at any time (603). When the current number of threads is not less than the maximum number of threads, the thread manager waits another thirty seconds; when the current number of threads is less than the maximum number of threads, the thread manager spawns a new worker thread (604). Those skilled in the art will appreciate that the wait time may be chosen as appropriate.

Figure 7:
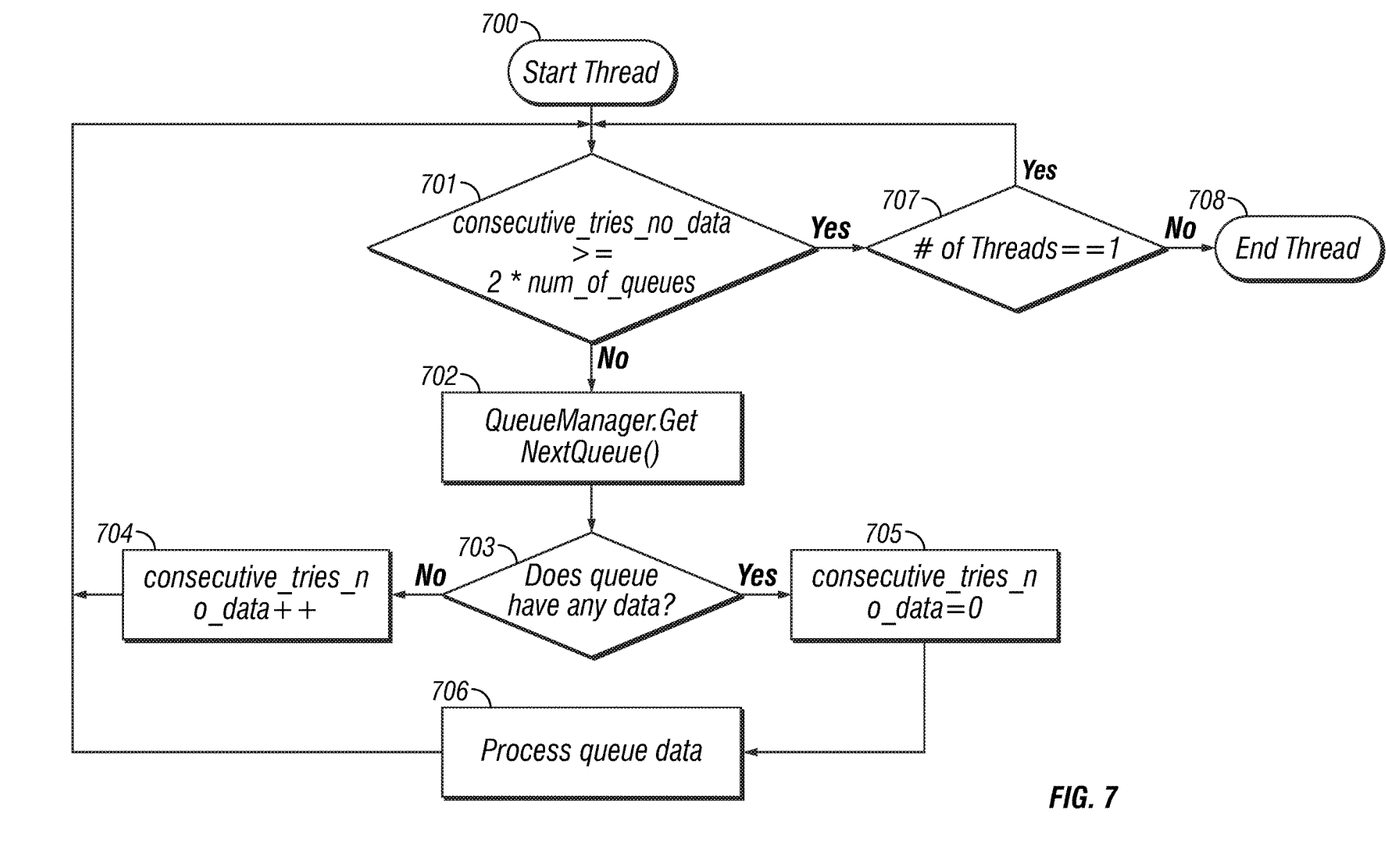
FIG. 7 is a flow diagram showing a worker thread algorithm in a messaging environment according to the invention.

FIG. 7 is a flow diagram showing a worker thread algorithm in a messaging environment according to the invention.

In FIG. 7, a thread starts (700)

When the consecutive number of tries in which there is no data is less than or equal to 2*the number of queues (701), the queue manager gets a next queue (GetNextQueue( )) (702).

The queue manager is a (thread safe) data structure that keeps track of which queues currently have a worker thread polling it and methods to get the count and next available queue to poll. With the queue manager, a worker thread can call the queue manager to get the next available queue, skipping the ones that already have threads polling the queue, as per FIG. 8; and it can get the count of queues currently being polled when the thread manager decides if it needs to spin up another thread.

When the consecutive number of tries in which there is no data is less than or equal to 2*the number of queues, the queue manager determines if the number of threads is equal to one (707). When the number of threads is not equal to one, the thread is ended (708); when the number of threads is equal to one, the thread manager determines if the consecutive number of tries in which there is no data is less than or equal to 2*the number of queues. Processing then continues as above.

When the consecutive number of tries in which there is no data is not less than or equal to 2*the number of queues, the queue manager determines if the queue has any data (703).

When the queue does not have any data, the queue manager determines if the consecutive number of tries in which there is no data the thread manager then determines if the consecutive number of tries in which there is no data is less than or equal to 2*the number of queues (704), and processing continues as above; when the queue has data, the queue manager determines if the consecutive number of tries in which there is no data the thread manager equals zero (705), and then processes the queue data (706) and then determines if the consecutive number of tries in which there is no data is less than or equal to 2*the number of queues. Processing then continues as above.

In embodiment of the invention, there is always at least one worker thread running. If a thread iterates through 2*the number of queues with no data found, then the thread dies, and the thread pool is thus increased by that thread, i.e., the thread that dies is now available should it be needed.

Figure 8:
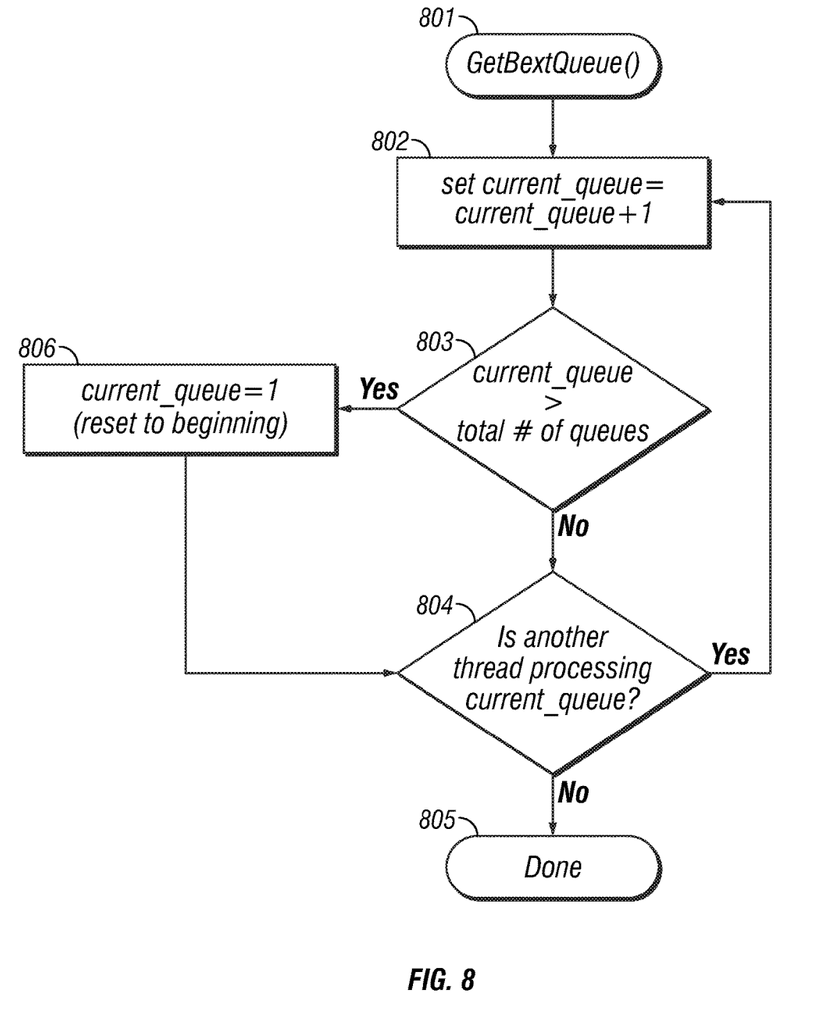
FIG. 8 is a flow diagram showing a GetNextQueue( ) algorithm in a messaging environment according to the invention.

FIG. 8 is a flow diagram showing a GetNextQueue( ) algorithm in a messaging environment according to the invention.

In FIG. 8, the system commences a GetNext Queue( )(801).

The current queue is set to be equal to the current queue plus one (802).

When the current queue is greater than the total number of available queues in the system (803), the current queue is set to one, (806) i.e., it is reset to the beginning; when the current queue is not greater than the total number of available queues in the system, the system determines if another thread is processing in the current queue (804).

When another thread is processing in the current queue, the current queue is set to be equal to the current queue plus one (802) and processing continues as set forth above; when another thread is not processing in the current queue, the process is done (805).

The system iterates through the queue list sequentially. When the system gets to the ends of the queue list, it restarts from the beginning of the list.

Computer Implementation

Figure 9:
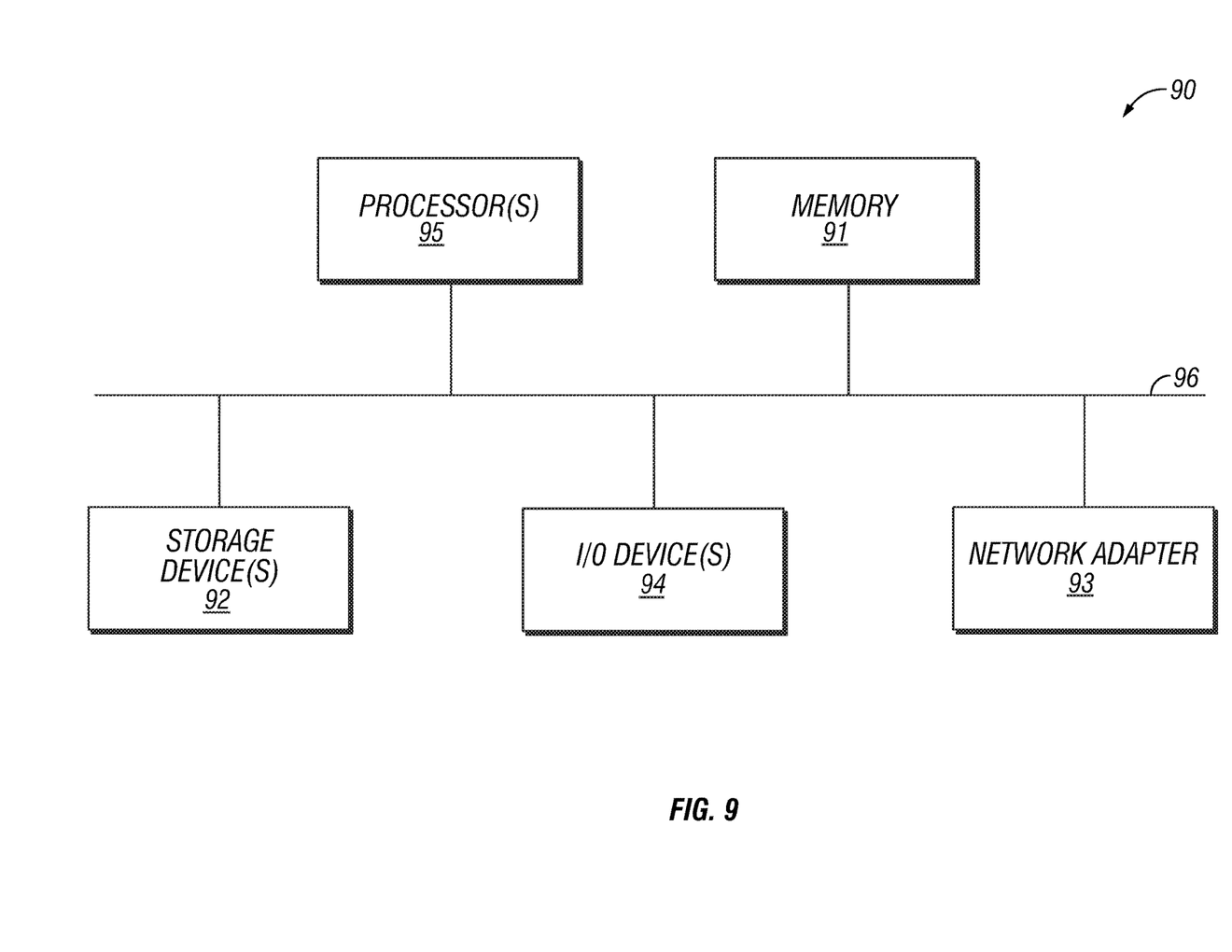
FIG. 9 is a block schematic diagram showing a machine in the example form of a computer system within which a set of instructions for causing the machine to perform one or more of the methodologies discussed herein may be executed.

FIG. 9 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 90 may include one or more central processing units ("processors") 95, memory 91, input/output devices 94, e.g., keyboard and pointing devices, touch devices, display devices, storage devices 92, e.g., disk drives, and network adapters 93, e.g., network interfaces, that are connected to an interconnect 96.

In FIG. 9, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 91 and storage devices 92 are computer-readable storage media that may store instructions that implement at least portions of the various embodiments of the invention. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media, e.g. non-transitory media, and computer-readable transmission media.

The instructions stored in memory 91 can be implemented as software and/or firmware to program one or more processors to carry out the actions described above. In some embodiments of the invention, such software or firmware may be initially provided to the processing system 90 by downloading it from a remote system through the computing system, e.g., via the network adapter 93.

The various embodiments of the invention introduced herein can be implemented by, for example, programmable circuitry, e.g., one or more microprocessors, programmed with software and/or firmware, entirely in special-purpose hardwired, i.e., non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented messaging method, comprising:
    providing a multi-tenant messaging environment comprising enterprise servers having multiple producers and consumers;
    providing a minimum of two threads comprising one thread manager and at least one consumer thread;
    providing a plurality of queues in which there is one queue per tenant;
    providing a dynamically determined thread pool of consumers that poll the queues;
    assigning each tenant's thread to a queue from said thread pool; and
    said thread manager controlling the number of active threads by periodically looking at all threads to determine status, wherein
        when all currently existing threads are busy, the thread manager adds a thread;
        when currently existing threads are not all busy, the thread manager takes no action; and
        when the thread manager cycles through all threads twice and identifies a thread that does not have a message, the thread manager terminates that thread.

2. The method of claim 1, further comprising:
    said threads polling said queues in a round-robin fashion in which each consumer thread is assigned to a queue in equal portions and in circular order, by handling all threads without priority;
    wherein each producer has equal access to threads in strict order without regard to message volume a producer may have.

3. The method of claim 1, further comprising:
    said thread manager dynamically maintaining thread pool size based upon a amount of traffic and a number of producers actively using the messaging environment.

4. The method of claim 1, further comprising:
    using a routing key to route a notification for an associated tenant among a plurality of tenants to one of a plurality of queues.

5. The method of claim 1, further comprising:
    when a queue has any messages, said consumer thread processing said message.

6. The method of claim 1, further comprising:
    starting a thread manager algorithm;
    said thread manager waiting for a predetermined interval;
    said thread manager testing to determine if all current threads are busy;

when said threads are not all busy, said thread manager waiting another predetermined interval;

when said threads are all busy, said thread manager determining if a current number of threads is less than a maximum number of threads that can be supported at any time;

when the current number of threads is not less than the maximum number of threads, said thread manager waiting another interval;

when the current number of threads is less than the maximum number of threads, said thread manager spawning a new thread.

7. The method of claim 1, further comprising:

starting a worker thread algorithm;

starting a thread;

when a consecutive number of tries in which there is no data is less than or equal to 2*a number of queues, a queue manager getting a next queue (GetNextQueue( ));

when the consecutive number of tries in which there is no data is less than or equal to 2*the number of queues, said queue manager determining if a number of threads is equal to one;

said thread manager ending said thread when the number of thread is not equal to one;

continuing processing when said thread manager determines that the consecutive number of tries in which there is no data is less than or equal to 2*the number of queues and the number of threads is equal to one;

when the consecutive number of tries in which there is no data is not less than or equal to 2*the number of queues, the queue manager determining if the queue has any data;

when the queue does not have any data, the queue manager determining if the consecutive number of tries in which there is no data processing continues;

when the queue has data, the queue manager determining if the consecutive number of tries in which there is no data the thread manager equals zero, and then processing the queue data.

8. The method of claim 1, further comprising:

starting a GetNextQueue( ) algorithm;

commencing a GetNextQueue( );

setting a current queue to be equal to a current queue plus one;

when the current queue is greater than a total number of available queues, the current queue is set to one;

determining if another thread is processing in the current queue when the current queue is not greater than the total number of available queues in the system;

when another thread is processing in the current queue, setting the current queue to be equal to the current queue plus one and continuing processing;

ending processing when another thread is not processing in the current queue;

wherein said method iterates through the queue list sequentially until it gets to the ends of the queue list, at which point it restarts from the beginning of the list.

* * * * *